United States Patent
Fowler et al.

(10) Patent No.: US 10,002,390 B2
(45) Date of Patent: Jun. 19, 2018

(54) MAPPING PENSION PLANNING TO A METAPHOR

(71) Applicant: Mercer (US) Inc., New York, NY (US)

(72) Inventors: George Fowler, Wraxall (GB); Brian Henderson, Edinburgh (GB)

(73) Assignee: Mercer (US) Inc., New York, NY (US)

( * ) Notice: Subject to any disclaimer, the term of this patent is extended or adjusted under 35 U.S.C. 154(b) by 560 days.

(21) Appl. No.: 14/459,175

(22) Filed: Aug. 13, 2014

(65) Prior Publication Data

US 2015/0052078 A1 Feb. 19, 2015

Related U.S. Application Data

(60) Provisional application No. 61/865,232, filed on Aug. 13, 2013.

(51) Int. Cl.
*G06Q 40/06* (2012.01)
*G06Q 10/10* (2012.01)
*G06Q 40/08* (2012.01)

(52) U.S. Cl.
CPC ......... *G06Q 40/06* (2013.01); *G06Q 10/1057* (2013.01); *G06Q 40/08* (2013.01)

(58) Field of Classification Search
CPC ..... G06Q 40/06; G06Q 10/1057; G06Q 40/04
See application file for complete search history.

(56) References Cited

U.S. PATENT DOCUMENTS

| 6,766,322 | B1 | 7/2004 | Bell |
| 7,536,704 | B2 | 5/2009 | Pierre et al. |
| 7,672,997 | B2 | 3/2010 | Chavis et al. |
| 7,783,552 | B2 | 8/2010 | Assia et al. |
| 7,917,415 | B1 | 3/2011 | Petruzzi |
| 8,113,958 | B2 * | 2/2012 | Johnson, Jr. ........... G06Q 40/06 463/4 |
| 8,243,074 | B1 | 8/2012 | Kilat et al. |
| 8,352,349 | B2 | 1/2013 | Surz |
| 8,398,490 | B1 | 3/2013 | Phelon et al. |
| 2009/0186678 | A1 | 7/2009 | Tirosh |
| 2012/0246046 | A1 * | 9/2012 | Hirsch ................. G06Q 10/06 705/35 |

FOREIGN PATENT DOCUMENTS

WO 2011114281 9/2011

OTHER PUBLICATIONS

Magdalena Bielenia-Grajewska, The Role of metaphors in the language of investment banking, university of Gdansk, 2009.*
Barclay Pension Jungle.
Fiduciary News, Jan. 8, 2013.
www.employeebenefits.co.uk/benefits/technology . . . Towers Watson launches DB pension app.

* cited by examiner

Primary Examiner — Hao Fu
(74) Attorney, Agent, or Firm — Fish IP Law, LLP

(57) ABSTRACT

A system for benefits management that includes a benefit metaphor engine that can apply a user-facing metaphor over the benefit plan, where characteristics of the benefit plan are used to identify rule sets to generate an appropriate metaphor. The metaphor presents information about the benefit plan within the metaphor setting, and allows for the user to make decisions within the metaphor that affect the benefit plan outside of the metaphor.

15 Claims, 8 Drawing Sheets

MAPPING PENSION PLANNING TO A METAPHOR

This application claims priority to U.S. provisional application No. 61/865,232, filed Aug. 13, 2013. U.S. provisional application 61/865,232 and all other referenced extrinsic materials are incorporated herein by reference in their entirety.

FIELD OF THE INVENTION

The field of the invention is the management of benefit plans.

BACKGROUND

The following description includes information that may be useful in understanding the present invention. It is not an admission that any of the information provided herein is prior art or relevant to the presently claimed invention, or that any publication specifically or implicitly referenced is prior art.

Pension and retirement planning is an important part of ensuring an individual's or family's long-term well being. Unfortunately, pension planning requires the consideration of many variables, both in the present and projected into the future. As such, it can be very difficult for a person to properly understand their long-term predicted needs and whether their pension plan adequately addresses those long-term needs, as well how any changes to the pension plan can ripple through their projections. A better approach would provide pension planning in a metaphorical manner that would be easier for an individual to consume.

Others have put forth efforts towards systems and methods to simplify complicated financial decisions. For example, U.S. Pat. No. 7,783,552 to Assia, et al, titled "Method and System for Representing Financial Information in a Gaming Environment", issued Aug. 24, 2010, discusses game overlays based on casino-style games of chance (e.g. roulette, slot machines, etc.) for financial transactions. In Assia, the user's interaction is limited to the input of a stock bet. Assia does not discuss metaphors for benefit planning, or the ability for a user to have input mid-game, and changing the metaphor outcome and real-world outcome based on these mid-game user inputs.

WO 2011/114281 to Penson, titled "System and Method for Real Time Trading Computer Game", published Sep. 22, 2011, discusses a game for real-time trading, where visual objects represent stocks, and the visual appearance of the objects changes based on real-world changes of the stocks. In Penson, the user's interactions are limited to buying or selling stocks. Further, Penson fails to discuss any long-term projections or representations of the effects of the user's actions.

U.S. Pat. No. 8,243,074 to Kilat, et al, titled "Method and System for Providing a Personalized and Dynamic Financial Caricature Graphic", issued Aug. 14, 2012, discusses a caricature avatar representing a person's financial state, which changes as the person's financial state changes. Kilat fails to discuss any benefit planning, projections or long-term estimations of the avatar or of a user's financial state based on decisions, or any direct interaction of a user with the avatar after the avatar generation that is reflected in the real-world financial state.

A non-patent reference "Barclays Pension Jungle", published Mar. 11, 2012 (hereinafter "Barclays"; see URL www.andrewhennessey.com/illustration for illustrates and character design for Barclays Bank, Journey through the Pension Jungle) illustrates presenting pension information in the form of a jungle map. However, Barclays fails to disclose any discussion or implementation of the map beyond an illustrative example, such as any interactive elements.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a system that simplifies the complexities of benefit management via the use of metaphors while accurately communicating the real-world significance and effects of a user's actions on the benefit as a part of a user's actions within the metaphor.

SUMMARY OF THE INVENTION

The inventive subject matter provides apparatus, systems and methods in which a system can receive inputs from one or more sources and provide feedback and outputs as needed as part of executing various aspects of the inventive subject matter. The system has at least one computer-readable non-transitory memory (RAM, ROM, flash, hard drive, solid state drive, optical media, etc.), at least one processor communicatively coupled to the memory, and can include interfaces to communicate to other devices as necessary as well as user interfaces to receive input from and provide output to one or more users.

The system can include a benefit metaphor engine configured to execute the methods and processes of the inventive subject matter. The benefit metaphor engine can be embodied by computer-readable instructions stored on one or more non-transitory memory (e.g., RAM, ROM, flash, hard drives, solid state drives, optical media, etc.), coupled to one or more processors within one or more computer systems, where the instructions are executable by the processor(s) to carry out various functions and processes associated with the inventive subject matter. The benefit metaphor engine could alternatively be a dedicated hardware device, such as a processor having embedded instructions specially programmed to carry out functions associated with the inventive subject matter. The benefit metaphor engine could include one or more interfaces, such as communication or device interfaces, that could communicatively couple with other computer systems, computing devices, or peripheral devices. For example, the benefit metaphor engine could have one interface functionally coupled to a benefits database to collect benefits data sets, another interface functionally coupled to a metaphor database to collect metaphor rules sets, and another interface functionally coupled to a user interface that allows a user of the system to interact with generated metaphors.

The benefit metaphor engine can receive benefit data sets corresponding to a benefit plan of a user, and derive one or more benefit attributes from the received benefit data sets.

The benefit attributes can include identification information related to the benefit plan, the user associated with the benefit plan, rules and attributes associated with the benefit plan according to the benefit plan type, and metaphor theme selection information.

The benefit attributes are then mapped to corresponding metaphor rule sets, and both the benefit attributes and the identified metaphor rule sets can be used to generate a benefit metaphor to present to the user.

The metaphor rule sets can include data and instructions necessary to implement the metaphor and present it to the user. The metaphor rule sets can include a metaphor theme, one or more metaphor APIs, one or more metaphor objects, a metaphor library, and one or more metaphor assets. The metaphor rule sets can be dependent on the metaphor theme, containing data and instructions specific to a particular theme or category of theme.

The themes of a metaphor can include a variety of themes that are attractive or entertaining to a user. Examples of themes can include a travel theme, an adventure theme, a science fiction theme, a sports theme, a racing theme, a battle theme, a game theme, a television theme, a movie theme, a board game theme, a musician theme, a comedy theme, a dramatic theme, a video game theme, a licensed theme, a social network theme, a religious theme, a scientific theme, a nostalgia theme, a patent theme, a legal theme, a meta theme, and an evolution theme.

The benefit metaphor is persistent, and can be used to simplify the presentation of a benefit plan by presenting the benefit plan in the form of an easy-to-understand game or simulation. The rules, values and decision points of the benefit plan can correspond to in-metaphor rules, values and decision points. When presented with an in-game metaphor decision point, the in-game metaphor can also present the real-world decision point to the extent necessary for the user to understand what the metaphor decision point represents. Projected consequences of the available decision options can also be provided in terms of in-metaphor consequences and associated real-world benefit plan consequences. The metaphor is configured to accept a user's decisions, and the decisions the user makes within the metaphor cause the execution of an associated real-world decision regarding the benefit plan.

For example, a pension plan can be presented as a travel metaphor, where the different aspects of a pensions plan (e.g. contributions, expected/desired retirement age, total amount contributed, etc.) can correspond to aspects of travel (e.g. the airspeed of an airplane, traveling in first class versus coach, the time to arrival, the amount of fuel in the airplane, a non-stop flight versus making connections, etc.).

To enhance the entertainment aspects while also encouraging desirable user behavior with respect to the benefit plan, the system can incorporate scoreboards or leaderboards. For metaphor themes that incorporate scoring or points, a scoreboard or leaderboard can be used to list the top players. The scoreboards or leaderboards can be sanitized to achieve a desired amount of privacy. For example, the system can simply present a user with their ranking within the global scoreboard without showing other players or their scores. Alternatively, the metaphors can use pseudonyms or in-game names to identify players without revealing any real-world identification information.

In certain situations, it may be necessary to present the user with information outside of the metaphor context, such as to comply with legal requirements regarding the presentation of certain types of information. In such cases, the benefit metaphor engine can derive data and rules from the received benefit data sets that allow the benefit metaphor engine to present information to a user outside of the metaphor setting as required.

Information associated with benefit plans of a user, including the benefit data sets, can be stored on one or more databases accessible to the benefit metaphor engine. Additionally, information can be received by prompting a user to enter the information via a user interface.

The metaphor data sets can be stored on one or more databases accessible to the benefit metaphor engine. The database can be local to the metaphor engine or located remotely, and accessed by the metaphor engine as needed.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
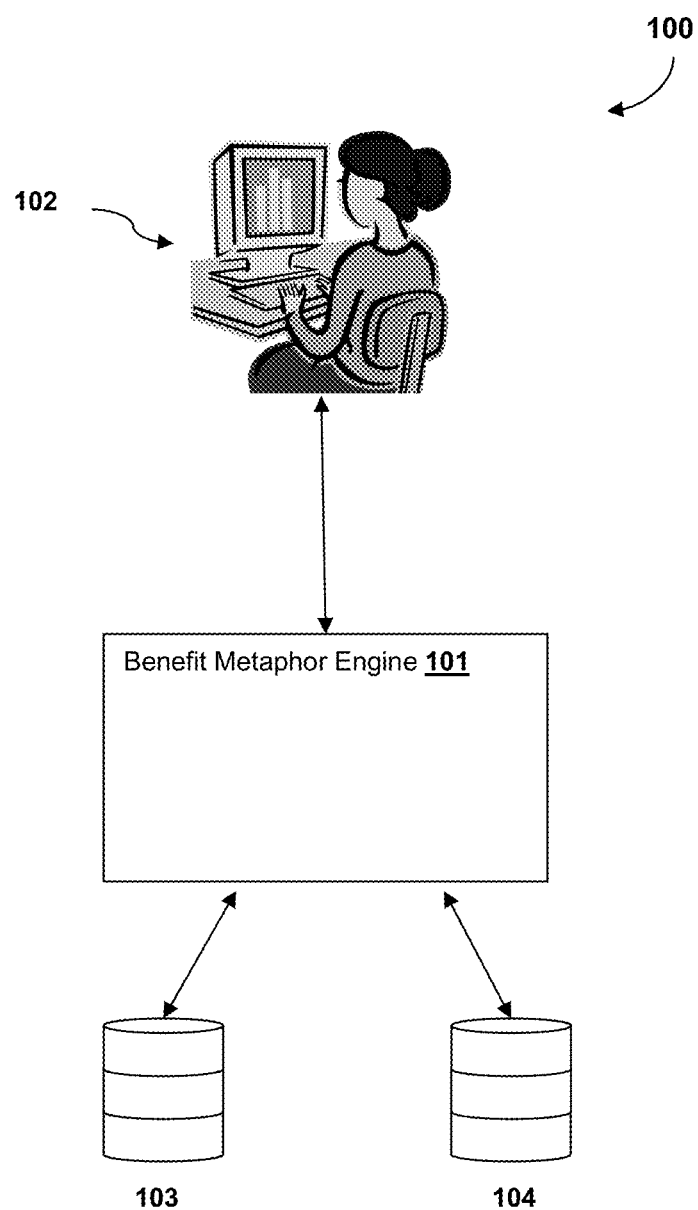
FIG. 1 provides an overview of an example system according to the inventive subject matter.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including enabling a user to engage in benefit planning via an engaging, easy to understand interface that accurately reflects the behavior of a benefit plan over time.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networking environment, the terms "coupled to" and "coupled with" are also used euphemistically to mean "communicatively coupled with" where two or more network-enabled devices are able to exchange data over a network with each other, possibly via one or more intermediary devices.

The systems and methods of the inventive subject matter discuss the generation of and user interaction with a benefit metaphor corresponding to the benefit plan of a user that is constructed and presented in such a way that it provides a user with an engaging, interesting and easy-to-understand way to track and manage an associated benefit plan. The benefit metaphor can be associated with the benefit plan such that the progress, actions, user decisions, consequences and goals of the metaphor reflect those of the benefit plan.

FIG. 1 provides an overview of the system 100, according to embodiments of the inventive subject matter. As shown in FIG. 1, the system 100 can include a benefit metaphor engine 101 communicatively coupled to a user interface 102, through which a user can interact with benefit metaphor engine 101 and other components of the system.

The benefit metaphor engine 101 can be can be embodied as computer-executable instructions stored on one or more non-transitory computer-readable storage media (e.g., hard drives, RAM, ROM, optical media, flash drives, etc.) that, when executed by one or more processors, cause the one or more processor to execute the described functions and processes of the associated subject matters. In embodiments, the benefit metaphor engine 101 can comprise computing hardware (e.g., one or more processors) specially programmed (e.g. via hard-coded instructions) to perform the processes and methods of the inventive subject matter.

The user interface 102 can be used by a user to access components of system 100, including the benefit metaphor engine 101. User interface 102 can include devices such as desktop computers, laptop computers, tablets, smart-phones, smart wearable devices, sensors (e.g., biometric, temperature, image, audio, etc.), web-portals or client-side applications accessible via one or more of these devices, and the devices can include input and output components that allow the users to enter data into the system 100 and receive data output from the system 100 (e.g., keyboard, mouse, touchscreen, display screen, microphones, stylus inputs, audio outputs, etc.).

While FIG. 1 illustrates a single user interface 102 communicatively coupled to the benefit metaphor engine 101, it is contemplated that the benefit metaphor engine 101 can be communicatively coupled with a plurality of user interfaces 102, such that a plurality of users can access the engine 101 and other components of the system 100.

As shown in FIG. 1, the benefit metaphor engine 101 can also be communicatively coupled to a benefits database 103 and a metaphor database 104.

The benefits database 103 stores benefits data sets associated with a plurality of users. Benefit data sets can include information regarding the user and the benefit plan to which a metaphor is to be applied. Generally speaking, the benefit data sets can be considered to be sets of raw data, rules, logic and other information that is used to implement and execute the benefit plan itself, such as by the benefit provider. The benefit data sets can also include security information, presentation information and other information related to the benefit plan and the user of the benefit plan. The data and information included in a benefit data set can be in the form of benefit attributes.

In embodiments, the benefit database 103 can be operated by the benefit provider. In these embodiments, the benefit data sets associated with the users can be considered to be the "original" or "source" benefit plan information of the user's benefit plan, used both for the functions associated with the inventive subject matter by benefit metaphor engine 101 as well as to manage the benefit plan itself. In these embodiments, any changes to the benefit data set will affect the benefit plan itself as well as the metaphors based on the benefit data set.

Alternatively, the benefit database 103 can be a copy of the benefit plan information (or a subset thereof), which is based on "original" or "source" benefit plan information stored in and administered by computing systems of the benefit provider (not shown). In these embodiments, the benefit database 103 can be communicatively coupled to benefit provider computing systems for the purposes of exchanging and updating information associated with various benefit plans. Changes to source benefit plan information can be provided to the benefit database 103 to update corresponding benefit data sets. The updates can be "pushed" to the benefit database 103 by the provider computer systems (such as in response to an update of the "source" data or according to a schedule) or requested by the benefit database 103 (e.g., periodically, according to a schedule, in response to certain actions or processes executed by the benefit metaphor engine 101, etc.). In these embodiments, the benefit database 103 can include benefit data sets corresponding to benefit plans associated with a plurality of benefit providers (as an individual can have benefit plans of various types and provided by various providers). It is contemplated that in these embodiments, the benefit database 103 can be operated by a benefit provider, or by a third party.

In embodiments where the benefits database 103 is a copy of a benefits database of a provider, benefit data sets can be created from the originals as needed, and deleted after their use, thus lowering the necessary storage capacity to carry out the methods of the inventive subject matter. For example, a benefit data set can be generated from source data for the purposes of creating and/or updating a metaphor, and then deleted when the metaphor generation or update task is completed.

Figure 2:
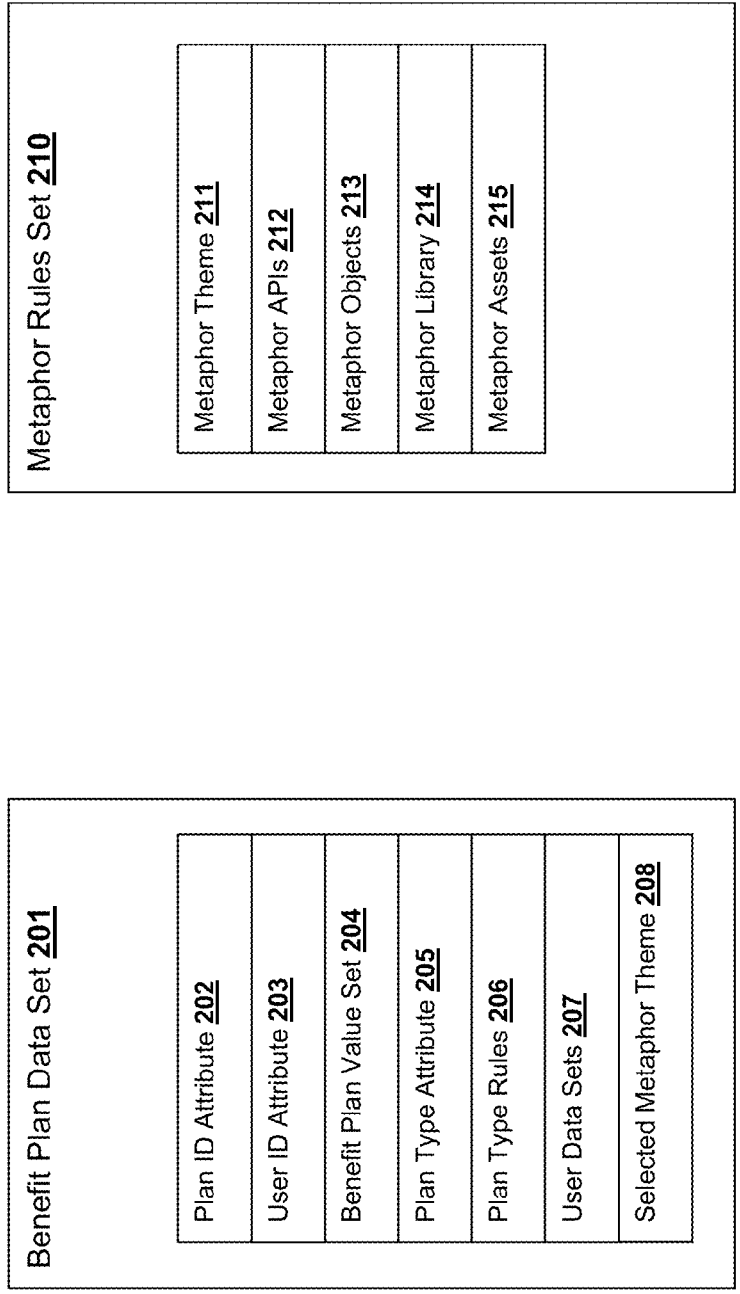
FIG. 2 provides a detailed view of an illustrative benefit data set and an illustrative metaphor rules set.

FIG. 2 provides an illustrative example of a benefit data set 201 including a plurality of benefit attributes 202-208.

Examples of benefit attributes can include plan identifier attributes 202 (e.g., identification information related to the benefit plan), user identifier attributes 203 (e.g., identification of the user associated with the benefit plan), benefit plan value sets 204, plan type identifier attributes 205 (e.g., identification of a benefit plan type), benefit plan rules and attributes 206 (e.g., the rules and attributes of the benefit plan, according to the benefit plan type), user data sets 207, and metaphor theme selection information 208. In addition to the attributes shown in FIG. 2, it is contemplated that the benefit data set 201 can include additional attributes, such as attributes associated with a user's historical interactions with metaphors using the system (e.g., user history, results, etc.), associations with other benefit data sets (e.g., links between the benefit data set for this user and this benefit plan with other benefit data sets representative of other benefit plans associated with the user or with other users), etc.

The benefit plan value sets 204 can include individual, plan-specific data related to the benefit plan held by the user. For example, the benefit plan value sets can include information such as a current benefit plan amount, a current benefit plan contribution level for the user, a current employer contribution level, a planned retirement age for the user, a user's goals related to the benefit plan, and other information applicable to the specific benefit plan associated with the benefit plan value sets.

The benefit plan type identifier attribute 205 can include information associated with the benefit plan selected among other benefit plan types. For example, an identification of the benefit plan as a defined benefit plan, defined contribution plan, IRA, 401(k), thrift savings plan, cash balance plan, hybrid plans, etc.

The benefit type rules 206 include information regarding the rules associated with the benefit types. This can include the decisions/interactions a user is enabled to make or permitted to make within a benefit plan (e.g., the available user inputs at various stages of a benefit plan, at which points in time and/or based on what conditions or situations, and how many different options does a user have with each decision), tax rules or implications associated with the benefit plans, and algorithms and variables that are used to calculate values associated with the plan (e.g., algorithms and variables used to calculate a particular benefit for a particular contribution, a particular state of the plan at a particular point in time, predictive algorithms, etc.). For example, for a defined contribution plan, benefit type rules 206 can include rules associated with employee contributions, employer contributions, vesting rules, withdrawal rules, predictive algorithms (used to estimate benefits given a plan status), etc.

The benefit type rules 206 can be updated according to available updates for that particular benefit plan type. The benefit metaphor engine 101 can periodically check for updates by communicating with computing devices of various established sources of information (e.g., the benefit provider, government agency information sources, market reporting sources). This periodic check can be set by administrators according to typical update schedules for the various benefit type rules 206, can be set on a periodic schedule (e.g., daily, yearly, quarterly, weekly, monthly, etc.). In embodiments, the benefit metaphor engine 101 can also receive "push" updates initiated by the benefit provider or other source of information to update one or more of the benefit type rules 206. For example, the benefit metaphor engine 101 can check for regulatory adjustments to contribution limits, changes to inflation, actuarial assumptions, tax changes, etc., according to their typical update schedules (e.g., for government/regulatory sources, this might be yearly or quarterly).

The user data sets 207 include information associated with the user having the benefit plan. This information can include a user's name, age, social security number, employment status (e.g., employer, years of service, etc.), marriage status, income, credit information, debt information, tax status, health information, family information, etc.

Metaphor theme selection information 208 can include a theme identifier, identifying the metaphor theme to be applied to the benefit plan. The benefit metaphor engine 101 can add the metaphor theme selection information 208 to the benefit plan data set 201 upon the selection of a metaphor theme.

In embodiments, the benefit metaphor engine 101 can derive benefit attributes from the received benefit data sets. The benefit attributes can be included within the benefit data sets, wherein the benefit metaphor engine can recognize and extract the benefit attributes from the benefit data sets (such as by recognizing data types, fields, etc. or subsets thereof that correspond to the benefit attributes necessary for use with the methods and processes of the inventive subject matter). For example, information within the benefit data sets can be collected and the benefit attributes can then be generated based on a matching of the collected benefits with attributes via queries, matching, statistical or clustering analysis processes.

For security purposes, some or all of the information of a benefit data set 201 can be encrypted according to known encryption methods, and decrypted as needed by the benefits metaphor engine 101 for use.

The metaphor database 104 stores metaphor rule sets 210 associated with available metaphors. The metaphor rule sets include data and instructions necessary to apply a metaphor to the user's benefit plan, and present the metaphor to the user. The metaphor rule sets 210 can include a metaphor theme 211, one or more metaphor APIs 212, one or more metaphor objects 213, a metaphor library 214, and one or more metaphor assets 215. The metaphor rule sets can be dependent on the metaphor theme, containing data and instructions specific to a particular theme or category of theme.

The metaphor theme 211 can be an identifier of the metaphor's theme, used to index the metaphor within the metaphor database.

The metaphor theme can be selected by the user, so that the metaphor theme is one that is entertaining or pleasing to the user. The metaphor themes can also be presented to a user for selection based on the benefit plan or benefit plan type. As such, particular themes may be more applicable to certain types of benefit plans than others. In some embodiments, the applicability of a particular metaphor theme can be determined by the degree to which a set of benefit attributes map to the metaphor rule sets of the particular theme. Alternatively, the 'best match' metaphor theme can be selected automatically for the user by the benefit metaphor engine. Examples of themes can include a travel theme, an adventure theme, a science fiction theme, a sports theme, a racing theme, a battle theme, a game theme, a television theme, a movie theme, a board game theme, a musician theme, a comedy theme, a dramatic theme, a video game theme, a licensed theme, a social network theme, a religious theme, a scientific theme, a nostalgia theme, a patent theme, a legal theme, a meta theme, and an evolution theme.

The metaphor API(s) 212 can include user interface APIs, metaphor execution APIs, benefits data matching APIs (converting benefit plan processes and data values to metaphor processes and data values, and vice-versa), etc.

The metaphor objects 213 can include data objects associated with a particular metaphor, their relationships and their effects on various aspects of a metaphor. For example, metaphor objects can include interactivity objects associated with receiving user input when the user interacts with the object, and the behaviors associated therewith. In an illustrative example of a metaphor of driving a car in a race, a metaphor object can include an object associated with a steering wheel, an accelerator pedal, a brake pedal, etc.

The metaphor library 214 can include modules, scripts, code and other functionality particular to the metaphor, used in the implementation and execution of the metaphor. This can include logic associated with receiving a user input, receiving other input data, processing a metaphor status or state based on input information, determining progress towards a goal, achieving a goal, etc. A metaphor rule set 210 can have more than one metaphor library 214, and a metaphor library 214 can correspond to one or more of the metaphor API(s) 212.

The metaphor assets 215 can include data such as images, graphics, and audio used in the presentation of the metaphor. The metaphor assets can be correlated to various states, levels, and other measurable metrics of progress within the metaphor to reflect the condition of progress of the benefit plan. Thus, metaphor assets can include various versions of an image (or object in an image), a place, etc., in various states of luxury, disrepair, prestige, etc. such that the metaphor can present recognizable forms of progress (or lack thereof) to the user.

Metaphor themes can be interchangeable during the life of the benefit plan. To change a metaphor theme, the benefit metaphor engine can re-start the metaphor selection and generation process from the beginning, such as by using received benefit data sets (or requesting new benefit data sets) to generate a new set of benefit attributes, map those new set of benefit attributes to metaphor rule sets and generate a new metaphor. As a part of generating a new metaphor, a selection of themes can be presented to the user.

Alternatively, benefit metaphor themes can be organized according to metaphor rule sets that map to particular sets of benefit attributes or benefit data plans known to generate particular sets of benefit attributes. In switching the benefit metaphor themes, the benefit metaphor engine can simply consult a database or other listing of the benefit metaphor themes similar to the theme being replaced and present those similar themes to the user for selection (or select another theme automatically). In this alternative, the benefit metaphor engine is not required to re-generate the entire metaphor.

The benefits database 103 and metaphor database 104 can each be embodied one or more non-transitory computer-readable storage media (e.g., hard drives, optical discs, solid-state drives, RAM, ROM, etc.) configured to store various data components associated with the inventive subject matter as described herein, which can be accessed by the benefit metaphor engine 101 via data exchange protocols and techniques to send and receive data.

Figure 3:
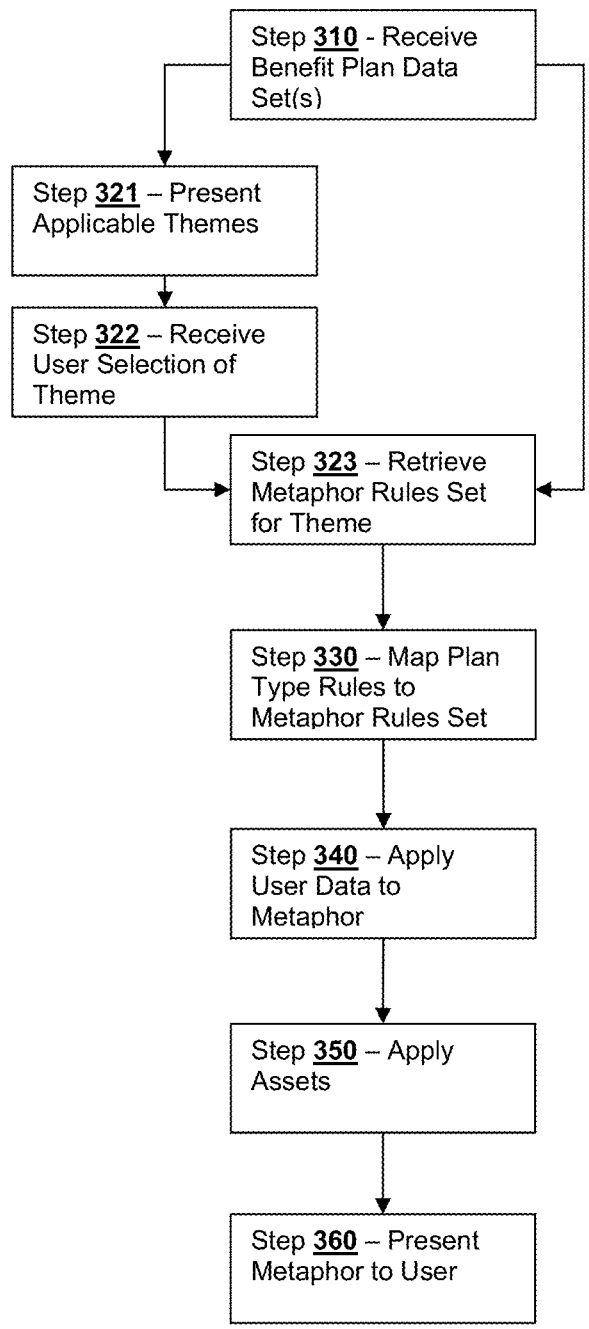
FIG. 3 provides a flow chart of the generation of a metaphor.

FIG. 3 provides an example process flow illustrating the generation of the metaphor, according to embodiments of the inventive subject matter. As an illustrative example, the generation a travel-themed metaphor for a user's retirement benefit plan will be described along with the steps of FIG. 3 (referred to for the purposes of this example as the "travel example").

At step 310, the benefit metaphor engine 101 receives at least one benefit plan data set 201 from benefits database 103. The benefit plan data set 201 can be received from a benefit provider that is providing the user's benefit(s) for which the metaphor(s) are to be generated. Information associated with the benefit plan data set 201 can also be provided by the user, via a submission or entry of requested information.

In the travel example, the benefit plan data set 201 can be considered to include the benefit plan goal of retiring by a particular date with a particular amount of post-retirement income, a user's contribution amount, a user's current income, an accumulated total amount of contributions, rules associated with possible user inputs (e.g., increasing/decreasing contribution amount, selecting to change the goal values of time and/or money as the retirement goal, withdrawal of money from the plan, etc.), the plan rules used to calculate the user's progress given past contributions to the present, and assuming contributions at the set amount, plan restrictions including limits on a total contribution per year as a percentage of income, and a permitted "catch-up" amount that the user can contribute beyond regular contributions per year.

The travel metaphor in the travel example presents the progress through the benefit plan as an airplane trip, with the ultimate goal of the benefit plan corresponding to the destination, with the distance and/or prestige of the destination reflecting the size of the benefit plan goal. The user-controlled variables in the metaphor (and implemented via the logic of the metaphor rules set) can include controlling the amount of fuel on the airplane (enabling the plane to fly farther, to a better destination), the speed of the airplane (causing the plane to fly faster, but burning up fuel faster so the same amount of fuel doesn't reach as far of a destination), and changing destinations (which can necessitate increasing the fuel or decreasing the speed for a farther destination, and conversely allow for increased speed or decreased fuel for a closer destination).

As discussed above, the benefit plan data set 201 can include a selected metaphor theme 208. FIG. 3 illustrates two different possibilities, one in which the data set 201 does not include the selected metaphor theme 208 and one in which the data set 201 includes a selected metaphor theme 208.

Where a metaphor theme has not been previously selected, the benefit metaphor engine 101 can present the user with available themes for selection at step 321. In embodiments, the available themes can be those that best fit the various attributes of the benefit plan data set 201.

At step 322, the benefit metaphor engine 101 receives the user's selection of a metaphor theme, and retrieves metaphor rule set(s) 210 associated with the selected theme from the metaphor database 104 at step 323. To retrieve applicable metaphor rule set(s), the benefit metaphor engine 101 can perform a mapping of the benefit attributes of the benefit plan data set 201 with metaphor attributes of various metaphor rule sets. The returned metaphor rule sets can be those having the most commonalities with the attributes of the benefit plan data sets (such as via clustering, weighted distribution analysis, or other such statistical correlation). Where multiple metaphor rule sets are selected, they can be merged or otherwise combined into a metaphor rule set based on the similarities of the benefit attributes with the corresponding metaphor attributes of the metaphor rule sets as well as similarities between corresponding metaphor attributes among the returned metaphor rule sets. As discussed above, the benefit attributes of benefit plan data set 201 can be a priori defined within the benefit plan data set 201 or derived by the benefit metaphor engine 101.

Where a benefit plan data set 201 contains a selected metaphor theme 208, the benefits metaphor engine 101 can proceed directly to step 323 and retrieve the metaphor rules set(s) 210 associated with the selected theme from the metaphor database 104.

At step 330, the benefit metaphor engine 101 begins the generation of the benefits metaphor by associating one or more of the benefit attributes of benefit plan data set 201 with one or more of the metaphor attributes of metaphor rules set 210.

The benefit type rules 206 can be categorized according to the function or purpose of the particular rule of the benefit type. Examples of categories of benefit type rules can include user input rules (e.g., type of input a user can input, binary choices, open-ended user choices, etc), benefit plan processing rules (e.g., how a state of a plan is calculated), benefit goals rules, restrictive rules (e.g., restrictions on certain user actions, plan values, etc., such as by law, regulation, policy, etc) and other categories. In embodiments, the categories can belong to a global list of categories using a common namespace across all benefit types.

Similarly, attributes of the metaphor rule sets 210 can be categorized according to the function or purpose within the generated metaphor. For example user input rules (reflective of the inputs available in-metaphor), metaphor goal attributes, etc.

For the purposes of mapping the benefit attributes and metaphor attributes can be correlated based on similar functions and/or purposes, whereby certain relationships between the benefit attributes and metaphor attributes are defined by the mapping. Examples of mapping can include mapping between a benefit plan goal attributes and a metaphor goal attributes, mapping between a benefit plan user input allowing for a certain input type (a binary input) with a corresponding binary input type attribute of a metaphor, etc.

To generate the framework of the benefit metaphor, the benefits metaphor engine 101 collects the various metaphor attributes and arranges them to mirror the benefit attributes of benefit type rules 206 such that the relationship between the metaphor attributes within the benefit metaphor mirrors the relationships between the benefit type rules.

In correlating value-based user inputs, amounts and other indicators of 'magnitude' or 'progress', the mapping can be based on a percentage of a whole of an aspect of the benefit plan correlated to a percentage of a representative aspect of the metaphor. Thus, for a benefit plan having a user's payments or contributions represented by speed, distance, strength, or other quantifiable attribute within the context of the metaphor, a user's contributions relative to a total (permitted total, possible total, etc.) can be represented in-metaphor as a current level of the attribute relative to a possible total.

In the travel example, the "user input" benefit plan rules governing the user's contribution to the benefit plan can be mapped to the "user input" metaphor rules of adding or subtracting fuel from the flight. However, as the maximum amount of contributions in the benefit plan is limited to a percentage of a user's income, the benefits metaphor engine 101 maps this limitation to set the maximum fuel tank size.

For the travel example, the constructed travel metaphor can include: a goal of a destination correlated to the user's retirement benefit goals; an in-metaphor interactive element of the plane's fuel amount correlated to the user's contributions to the plan; an in-metaphor interactive element of the plane's throttle control correlated to a user's defined retirement date; an in-metaphor plane navigation system allowing for changes in destination correlated with the user's desired amount of post-retirement income level; and logic associated with calculating the progress of the flight correlated to the rules used to determine the current state of the retirement benefit plan.

The result of step 330 can be considered to be the "skeleton" of the metaphor, whereby the logic, functions and processes of the metaphor have been assembled to reflect the characteristics of the benefit plan, without yet having actual plan benefit values or metaphor assets applied to the plan. At this point, the values used by the metaphor to reflect the benefit plan values can be null values.

As part of the metaphor generation process, the user may be presented with options regarding the level of interactivity they wish to have with the metaphor. This level of interactivity can reflect the level of interaction a user wishes to have with their real-world benefit plan. The levels of interaction can be categorized or otherwise structured to provide the user with the desired level of automation, depending on how "hands-on" the user wishes to be with the metaphor and, consequently, the benefit plan. The metaphor levels of interaction can also mirror pre-determined levels of interaction of the benefit plan itself. For example, in a benefit plan, a user may have the options of individually selecting assets, select from groupings of assets, or delegate the selection of assets to the benefits provider or other party. Correspondingly, the benefit metaphor can be customized such that the in-metaphor interaction options corresponding to the various levels of asset selection be enabled or disabled based on the user's desired level of involvement in selecting assets.

At step 340, the benefits metaphor engine 101 can populate the metaphor "skeleton" created at step 330 based on the benefit plan value set 204 and user data sets 207. In the travel example, this can be incorporating the user-specific values of the plan to determine the in-metaphor levels of various variables (fuel, fuel capacity, speed, top speed, distance, prestige of destination, etc.) to be used. This allows for the determination of correlation amounts between the benefit plan rules and values and corresponding metaphor rules and values, such that changes to the benefit plan data set 201 can be properly incorporated into and represented by the metaphor, and wherein user inputs within the metaphor can be accurately translated to corresponding changes in benefit plan data.

At step 350, the benefits metaphor engine 101 can apply the metaphor assets to the metaphor, including visual and audio assets to generate the metaphor of the user's selected theme, the assets associated with the various interactive elements of the metaphor, and adjusting the various video and audio assets used in the metaphor to appropriately reflect the values of the benefit plan from the benefit plan value set 204 and user data sets 207. In the travel example, this can include graphics associated with an airplane cockpit and associated instruments, including gauges reflecting the various states of the variables that determine the progress of the in-metaphor goal (and thus reflecting the states of various variables of the retirement plan).

At step 360, the generated metaphor is presented to the user via the user interface.

In embodiments, the benefits metaphor engine 101 can obtain additional benefits data sets, such as those associated with other benefit plans for a user. In these embodiments, the benefit metaphor engine 101 can derive one or more additional benefit attributes from the additional benefits data set(s) and modify the generated metaphor based on the additional benefit attribute. For example, a user may have more than one retirement plan, and thus attributes from a second retirement plan that are not part of the first retirement plan, but that can affect a user's overall retirement goals, can be incorporated into a metaphor generated for the first retirement plan to properly account for the effects of the existence of the second retirement plan.

Figure 4:
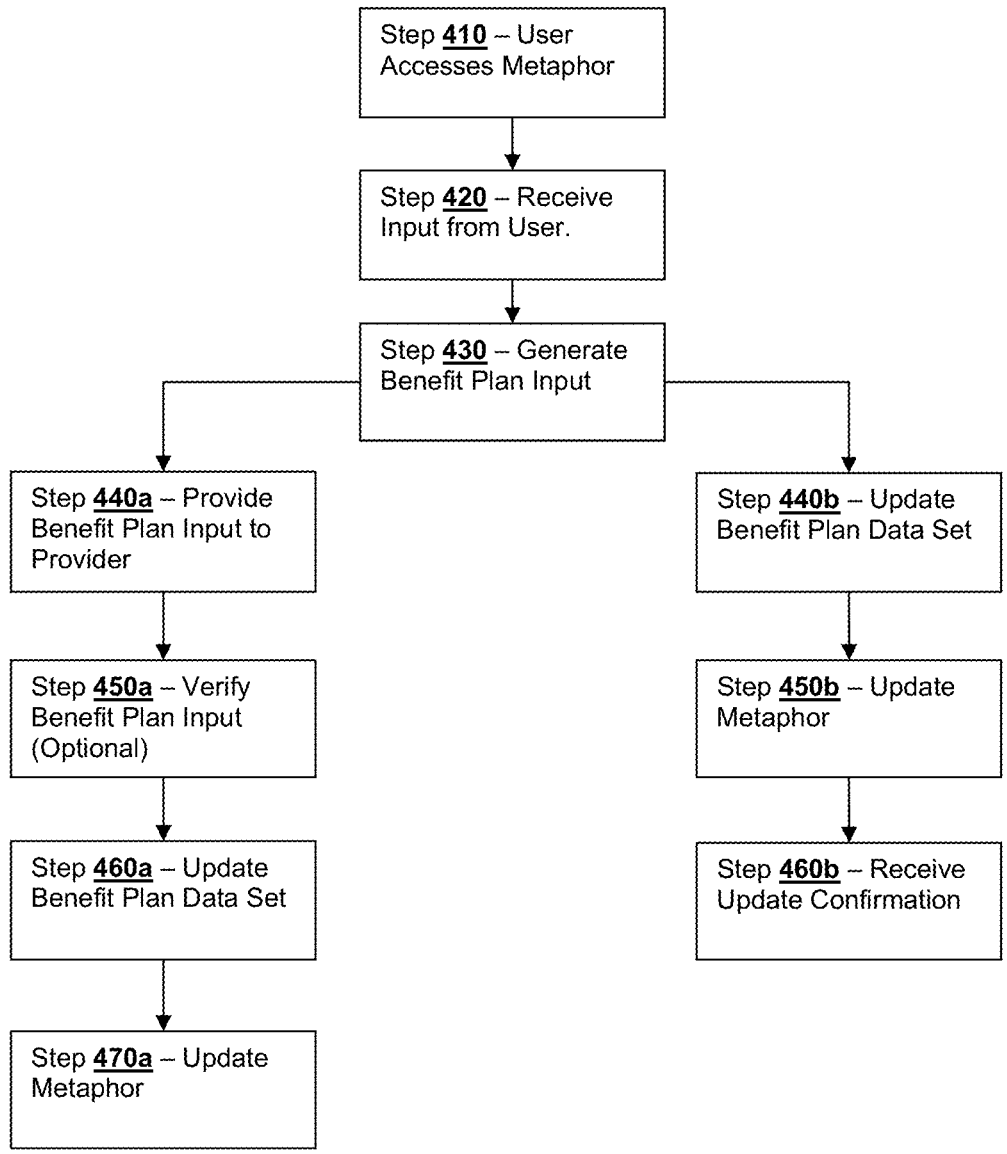
FIG. 4 provides a flow chart of the processing of user input within the metaphor.

FIG. 4 provides a flow diagram illustrating user interactions with the generated metaphor after it has been generated, whereby user interactions within the metaphor serve to cause a change to the benefit plan information, according to embodiments of the inventive subject matter.

At step 410, a user accesses the metaphor via the user interface, whereby the metaphor is presented to the user. When a user accesses the metaphor, the benefits metaphor engine 101 can be programmed to apply any updates to the metaphor's appearance since the last time the user accessed the metaphor. The user can be required to log in to the service provider providing the benefits metaphor to access the metaphor.

At step 420, the benefit metaphor engine 101 can receive an input from the user, corresponding to an interaction with an interactive element within the metaphor. In the travel example of FIG. 3, this can include adding fuel to the fuel tank to reflect a desired increase in contributions to the retirement plan.

The benefit metaphor engine 101 receives the user input and converts the input into a benefit plan input at step 430. The benefit plan input is an input to change an aspect of the benefit plan, in the appropriate format and protocol for the computing system of the benefit plan provider to implement the user input. In the travel example, the benefit metaphor engine 101 converts the increase in fuel (either in percentage or amount of in-metaphor fuel) to a corresponding increase in the user's contribution, such as by an actual amount in currency or by a percentage of paycheck.

The extent of the user's input is limited by the metaphor presentation. In other words, the metaphor is generated such that the interaction within the metaphor falls within the parameters of the permitted actions of a user with the benefit plan itself. However, where the user interaction with the metaphor presentation allows for an open-ended user input (e.g., an alpha-numerical input entered by the user) that is not limited by the in-metaphor presentation, the benefit metaphor engine 101 can perform a verification of the user inputs to ensure they fall into the permissible interaction with the metaphor.

Following the generation of the benefit plan input at step 430, the benefit metaphor engine 101 processes the input from the user and implements the effects of the input into the metaphor and benefit plan. FIG. 4 provides two alternatives for this processing and implementing of the user input.

In a first embodiment (illustrated by steps 440a-470a), the metaphor is only updated to account for user input once the corresponding changes to the actual benefit plan information are made.

At step 440a, the benefit metaphor engine 101 provides the benefit plan input to the computing system of the entity managing or administering the benefit plan, whereby the "source" benefit plan information (i.e., the original or official benefit plan information) can be ultimately updated by the provider based on the provided benefit plan input.

Prior to updating the benefit plan information, the computing system of the benefit provider can optionally verify that the requested user actions in the benefit plan input are within certain parameters of permissible activity (e.g., that an increase in an employee's contribution results in a total contribution within the permitted amounts, a withdrawal is within the actual amount of the benefit plan, etc.) at step 450a. If the benefit plan input (and/or the results of implementing the benefit plan input) is found to fall outside of the permitted actions and or results, the computing system of the benefit provider can provide a denial to the benefit metaphor engine 101, which can in turn present a corresponding message to the user. The message can be within the metaphor (i.e., the in-metaphor action or effect not within the permissible rules of the metaphor) or outside of the metaphor (i.e., the corresponding requested user action to the benefit plan and/or the result of the action are not permissible for the benefit plan).

In embodiments where it is a person that must enact the changes to the benefit plan (e.g., a human-resources representative or benefit provider representative manually updating the plan information), the benefit metaphor engine 101 can be programmed to transmit the benefit plan input information to be used in updating the benefit plan by generating an email or other electronic notification.

At step 460a, the "official" benefit plan information stored by the benefit plan provider and the benefit plan data set 201 are updated. In embodiments, the official benefit plan information can be updated first to apply the user's changes to the benefit plan itself, and then the benefit plan data set 201 can be updated based on the updates to the benefit plan information. The update can be via a "push" from the benefit plan provider computing system, such that the benefit plan data set 201 is updated as soon as the benefit plan information housed by the benefit provider is updated. Alternatively, the update can be requested by the benefits database 103 according to a set update schedule (e.g., daily, etc.). Where the "official" benefit plan information is contained in the benefit plan data set 201 within benefits database 103, the benefits provider computing system can perform the changes to the benefit plan data directly, in response to the received benefit plan input.

At step 470a, the benefits metaphor engine 101 updates the metaphor based on the updated benefit plan data set 201, reflecting the changes performed to the benefits plan information. Updating the metaphor can include updating presentation elements affected by the changes, updating scores, progress indicators towards a goal, etc.

In the travel example, the execution of the embodiment of steps 440a-470a would result in the benefit provider processing the requested increase in contribution, updating the retirement plan data accordingly (including updating the benefit plan data set 201), and then the benefit metaphor engine 101 updating the travel metaphor to reflect the increased contributions in the retirement plan. Thus, depending on the speed and regularity of the processing by the benefit provider, it is possible that the user might not see the update to the metaphor immediately or in-real time.

In a second embodiment, the metaphor is updated based on the user input without prior to any interaction with the benefits provider. As such, the metaphor can be updated without any potential delay associated with requiring updates to benefit plan information by the benefit provider.

At step 440b, the benefits metaphor engine 101 updates the benefit plan data set 201 based on the generated benefit plan input.

At step 450b, the metaphor is updated based on the updated benefit plan set 201.

Concurrently with or following step 440b or 450b, the benefit plan input and/or the updated benefit plan data set 201 can be provided to the benefit provider computing system to update the benefit plan information (if separate from the benefit plan set 201). The benefit provider can optionally verify that the benefit plan input and/or the updated benefit plan data set are valid operations for the benefit plan under the benefit plan's rules, regulations and/or restrictions.

Having received the benefit plan input and/or updated benefit plan data set, the benefit provider computing system can update the benefit plan information and provide confirmation that the benefit plan information has been updated at step 460b.

In embodiments where the official benefit plan information is the information within benefit plan data set 201, the benefit provider computing system can verify that the updates are valid operations for the benefit plan under the benefit plan's rules, regulations and/or restrictions, and provide the confirmation of same at step 460b.

If the confirmation cannot be made or is not received by the benefits metaphor engine 101 by a pre-defined period of time, the benefit metaphor engine 101 can provide notification to the user and undo the changes to the presented metaphor, as well as undo any changes to the benefit plan data set 201.

In presenting a previously initiated metaphor for a user, such as when a user logs in to interact with the metaphor after the initial application of the metaphor to the benefit plan, the metaphor will be updated to account for any changes to the benefit plan (via changes to the benefit plan data set 201) since the last time the user logged in. These updates can include updates based on changes to one or more attributes of benefit plan data set 201 due to user action outside of the metaphor (e.g., the user changing aspects of the benefit plan such as contributions via the benefit provider directly), as a consequence of the ongoing benefit plan (e.g., growth in total amounts, updated projections of benefits), due to changes of factors affecting a benefit plan (e.g., changes in interest rates, market changes, tax rules, etc.). If, since the last user session, there are any new decisions that a user needs to make or act upon, they will be presented to the user. Any effects are then applied to the benefit plan, and the benefit metaphor engine then updated the metaphor based on the updated benefit plan information. Additionally, during the execution of the metaphor, the benefits metaphor engine 101 can periodically check for updates to the benefit plan data set 201 and incorporate any corresponding changes to the metaphor.

In certain situations, it may be necessary to present the user with information outside of the metaphor context. For example, depending on a benefit type, a benefit plan itself, or laws associated with a benefit, there may be a legal requirement that certain information and options must be presented to a user in a certain way (e.g., free of any kind of explanation, metaphors, or any kind of translation or obfuscation) or it may be preferable to do so for transparency and clarity. In another example, the presentation information may be the benefit plan itself presented to the user, where the user can see the actual data related to the benefit plan as needed. This can be used in situations where updates must be or are preferably made to the benefit plan directly, such as a user's name change, address change, life event report, etc. Likewise, there may be legal requirements that certain acknowledgements and decisions by a user be made in clear, certain, standardized terms. In still another example, even if not legally required, it may be desirable to require a user to confirm an in-metaphor action by presenting to the user the equivalent benefit plan action and (if applicable), the result of the action to the benefit plan outside of the metaphor. In such cases, the benefit metaphor engine can derive data and rules from the received benefit data sets that allow the benefit metaphor engine to present information to a user outside of the metaphor setting as required. This type of information can be included in the benefit data sets as metaphor-exempt data sets or metaphor-exempt data attributes.

The metaphor-exempt data sets can include identifiers that designate one or more of the benefit attributes derived from a benefit data set as exempt attributes. The metaphor-exempt data set can also include presentation information. The presentation information can include the information itself that is to be presented outside of the metaphor, as well as data related to the format of the presentation (e.g. display size, font size, separation from any other information on the screen, links to websites with additional information, input prompts for required user decisions or user confirmations indicating the user has received and read the information, etc.). The presentation information can be configured to comply with legal requirements regarding presentation of content, privacy, user authentication, acknowledgements of information receipt and understanding, and user decision-making.

Figure 5:
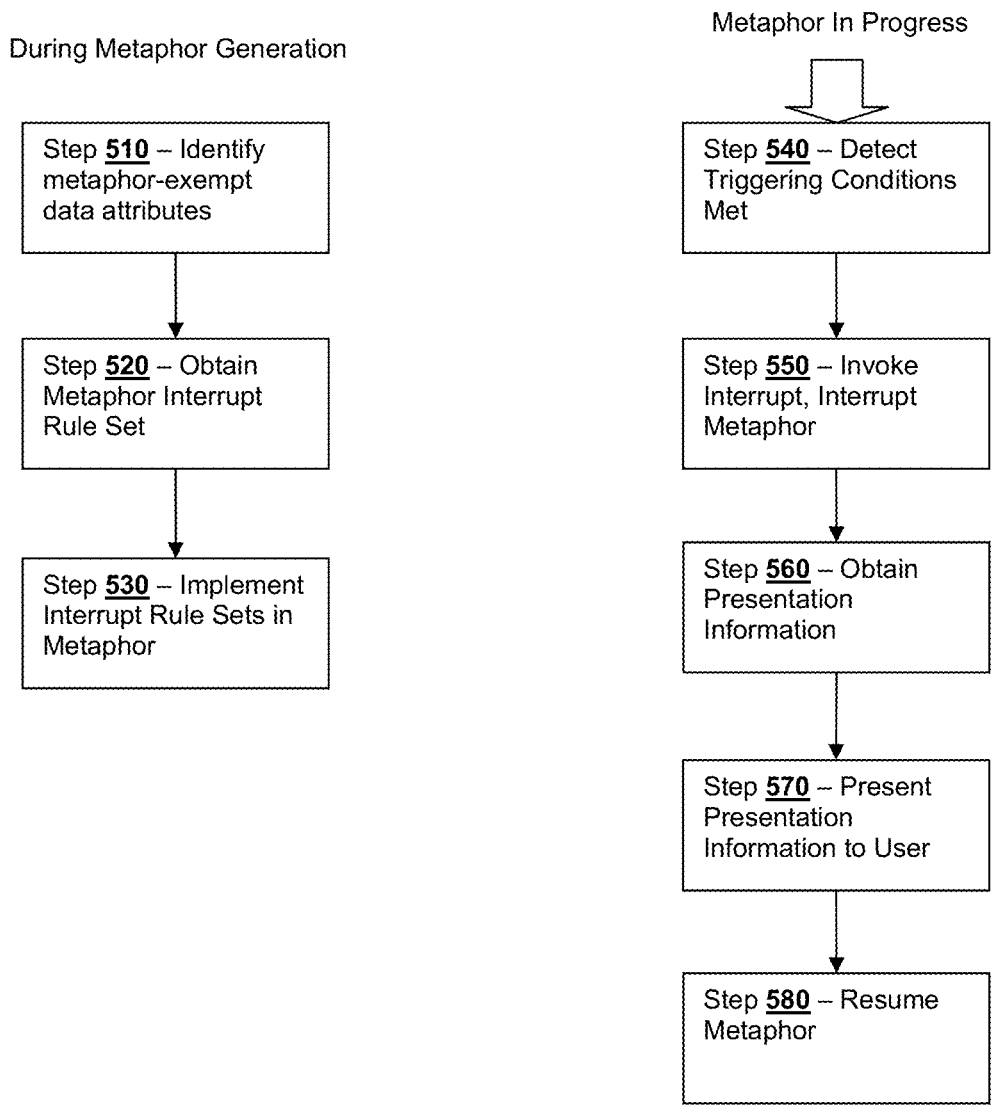
FIG. 5 provides a flow chart of the processing of a metaphor interrupt.

FIG. 5 illustrates an overview of the process whereby a metaphor interrupt rules set is incorporated into the generated metaphor, and whereby the metaphor is interrupted in order to present information or receive input from the user outside of the metaphor process.

Steps 510-530 of FIG. 5 are directed to the incorporation of a metaphor interrupt rules set into the generated metaphor at the time the metaphor is being created.

During the generation of the metaphor (such as during the process described in FIG. 3), the benefit metaphor engine 101 identifies metaphor-exempt data attributes within the benefit plan data set 201 at step 510 and obtains an associated metaphor interrupt rule set based on the identified exempt attributes at step 520. The metaphor interrupt rule set causes the interruption of the metaphor for the presentation of the information outside of the metaphor. The interruption can be based on a trigger related to a user decision, a benefit plan decision point to be presented to a user, a time- or schedule-based presentation of information, a user's age, a benefit plan level, or other factors associated with a benefit plan that require the presentation of information to a user outside of the metaphor environment. Thus, the metaphor interrupt rule set can be instructions that include one or more conditions that, when met during the execution of the metaphor, cause the benefit metaphor engine 101 to interrupt the metaphor.

Depending on their function and association to their corresponding metaphor-exempt data sets or attributes, metaphor interrupt rules sets can be background processes that are executed periodically during the execution of the metaphor, monitoring the state of the triggering conditions, and/or processes specifically executed when their associated metaphor-exempt data sets or attributes are invoked and/or executed.

To implement the metaphor interrupt rules set, the benefit metaphor engine 101 associates the metaphor interrupt rule set with the aspect(s) of the benefit plan and/or metaphor requiring the interruption at step 530, thus setting the conditions to trigger the interrupt. The information to be presented in response to the interrupt is similarly associated with the metaphor interrupt rules set.

For example, an early withdrawal of resources from the benefit plan may legally require informing the user of the tax consequences of the withdrawal in certain legally-defined, unambiguous terms. In this example, the benefit metaphor engine 101 associates a metaphor interrupt rule set with the "withdrawal" user action as the conditions to trigger the interrupt. Thus, performing an in-metaphor action that corresponds to a withdrawal of resources from the benefit plan would meet the triggering conditions of this metaphor interrupt rule set and cause the metaphor to be interrupted. The actual information required to be presented to the user would also be associated with the metaphor interrupt rule set, and would be presented to the user as required and in the manner required outside of the rule set.

Steps 540-580 describe the process whereby the metaphor is interrupted during execution by invoking the metaphor interrupt rules set.

Prior to step 540, the metaphor is executing normally, presenting the metaphor to the user associated with a user's benefit plan. At step 540, the benefit metaphor engine 101 detects that the triggering conditions for a metaphor interrupt rules set have been met. Continuing with the "withdrawal" example discussed to illustrate step 530, at step 540 the benefit metaphor engine 101 detects the user performing an in-metaphor action corresponding to the withdrawal of resources from the benefit plan meets the conditions of the associated metaphor interrupt rules set.

At step 550, the benefits metaphor engine 101 invokes the interrupt functions of the metaphor interrupt rules set and interrupts the executing metaphor. The interruption can include a termination of the metaphor's execution (i.e., completely exiting the metaphor on the user's computing device) or a suspension of the metaphor's execution (e.g., stopping, freezing, or otherwise blocking access to the metaphor without terminating its actual execution).

At step 560, the benefits metaphor engine 101 retrieves the presentation information to be presented to the user outside of the metaphor, such as from the benefits database 103. In the "withdrawal" example, the benefits metaphor engine 101 retrieves the relevant tax consequence information and, at step 570, presents it to the user. It is contemplated that the information can be a link to website or other source of information, whereby clicking on the link brings up an internet browser that accesses the relevant information.

At step 580, the benefits metaphor engine 101 resumes the metaphor after the presentation information has been presented to the user. To resume the metaphor, the user can be required to take an action such as to confirm by clicking on a button or link that they have read the presented information, to confirm they would like to proceed with the initiated action, etc.

The presentation information can be presented to the user outside of the metaphor by terminating the presentation of the metaphor prior to presenting the presentation information to the user. In this example, the presentation is interrupted and the metaphor resumes as if it was the start of a new user session with the metaphor.

The underlying metaphor can also be suspended and remain active at a client or server level so that the presentation can be resumed quickly after the reasons for the interruption have been satisfied (i.e. the user has received the information outside of the metaphor and, as required has taken the appropriate follow-up actions such as acknowledgment, made a decision, etc.).

Alternatively, the presentation information can be overlaid or superimposed over the metaphor so that the user can properly view the presentation information. Any remaining visible aspects of the metaphor can also be de-emphasized on-screen (such as by being darkened, presented out of focus, etc.) to ensure that the user pays the necessary attention to the presentation information without distraction from the metaphor.

The benefit metaphors can be applied over the life of the benefit plan to the conclusion of the benefit plan or to completing the goal of the benefit plan, and represent the progress and development of the benefit plan over time in various ways.

In one example, the benefit plan can be represented by a metaphor having one goal (mirroring the single end goal or endpoint of the benefit plan, such as an anticipated retirement date), with the situations, decisions, and variations of the benefit plan along the way represented by variations within the metaphor according to the theme. In this example, the benefit plan is represented in the metaphor as one long voyage with the goal of the benefit plan being the ultimate destination of the trip.

In another example, the benefit plan can be broken up into stages, and the metaphor reflective of the individual stages. The stages can be of a periodic duration or can be related to decisions, milestones or other designated markers of the benefit plan's life. In this example, the ultimate benefit plan goal of retirement can be the ultimate outcome of the metaphor, with the individual stages of the benefit plan being individual events within the metaphor. For example, in fantasy setting, the user could be a knight involved in fighting a war against an orc army, where each stage of the benefit plan is an individual battle or mission whose outcome helps the ultimate outcome of winning the war (reaching the goal of the benefit plan). In a sports setting, yearly benefit plan stages can represent seasons, with the ultimate goal of the metaphor being that the user retires the metaphor sport as a hall of famer.

The system 100 can incorporate scoring features to metaphors to increase the entertainment value of the metaphors, as well as to encourage desirable user behavior. The metaphor rule sets can incorporate scoring rules that can attribute scoring to certain aspects of the metaphor. For example, points or other scoring metrics can be awarded based on users achieving milestones or other goals within their benefit plans, as reflected via goals achieved within the metaphor. Similarly, user decision-making can be rewarded with points and undesirable user behavior can similarly be penalized by subtracting points.

The metaphor scores can also be derived from benefit attributes derived from benefit data sets. In this way, the score can be generated not only by user actions within the metaphor, but also user interactions with their benefit plan outside of the metaphor environment.

The metaphor scores can be used to award rewards to the user. The rewards can be in-metaphor rewards, such as trophies, celebratory scenes or other recognition according to the metaphor theme. The rewards can be accessories or bonuses usable within the metaphor. These accessories or bonuses can be purely aesthetic within the metaphor (i.e. they do not have any effect on the real-world benefit plan) or can be rewards that positively affect the real-world benefit plan. The rewards can also be rewards existing outside the metaphor and the benefit plan, such as gift cards for particular merchants, special product offers, etc.

The system can further incorporate a scoreboard or leaderboard feature, that can allow users to see where they rank among many similar users. The scoreboards can be organized according to one or more of specific metaphors, specific plans, providers, employers, demographics, geographically, etc. The scoreboards can be as inclusive or exclusive as desired to provide incentive and entertainment. For example, global scoreboards can include everyone that uses the system ranked by points. The scoreboards and leaderboards can incorporate privacy features to ensure that user privacy is maintained. For example, the scoreboards may be presented in such a format that the user only is able to view their ranking relative to the applicable community, without seeing any information related to other users. Alternatively, pseudonyms or metaphor-specific user names can be used in scoreboard listings, with or without a display of point values, in such a way that a user's real-world information is not disclosed.

Figure 6A:
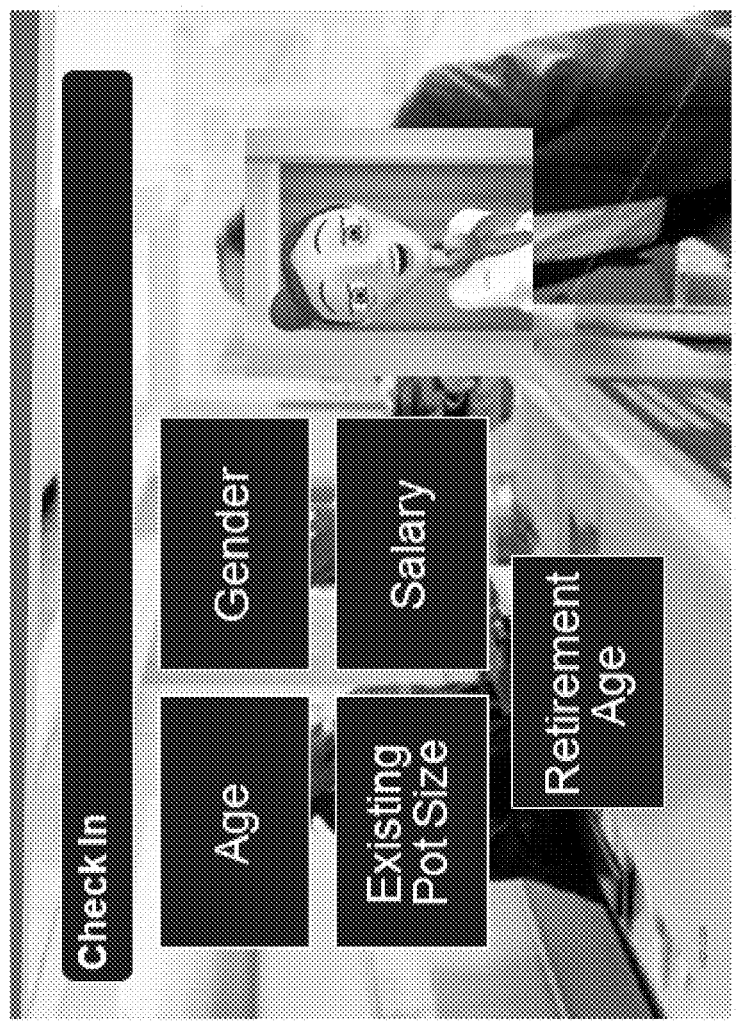
FIGS. 6a-6c provide examples of user-facing screens of a sample metaphor applied to a benefit plan.
Figure 6B:
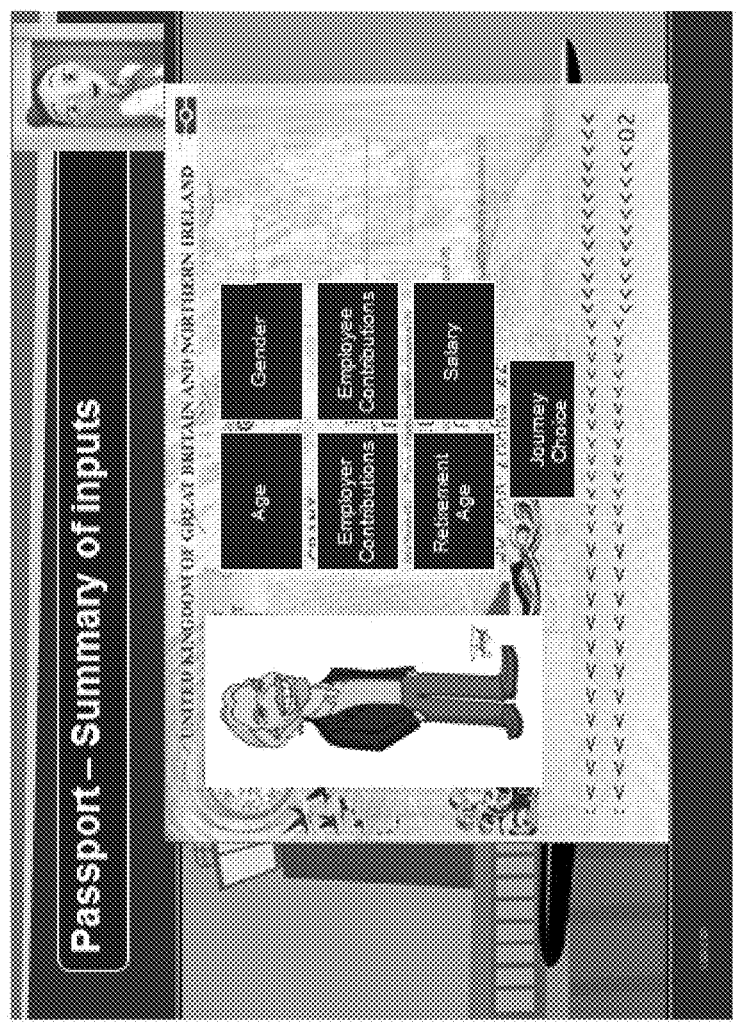

The following are examples of possible implementations of the benefit metaphors for the management of a benefit plan:

In one example, a user can manage a pension plan via an applied travel metaphor, where the user is travelling towards their destination of retirement. As illustrated in FIG. 6a, the metaphor can ask a user to 'check in' at the airport, gathering information from the user such as the user's age, gender, the existing pot size, salary and desired retirement age. Some or all of this information can alternatively be gathered from the pension plan provider. As shown in FIG. 6b, this gathered information can be presented within the metaphor in the form of a user's passport or a flight plan. The passport can include a photograph of the user, or a caricature or other avatar of the user, which can be automatically generated or user-selected. The contribution (employer and personal) information is then used to calculate the fuel available for the airplane to fly. Additional information gathered can include a desired annual income during retirement and a minimum income required during retirement.

Figure 6C:
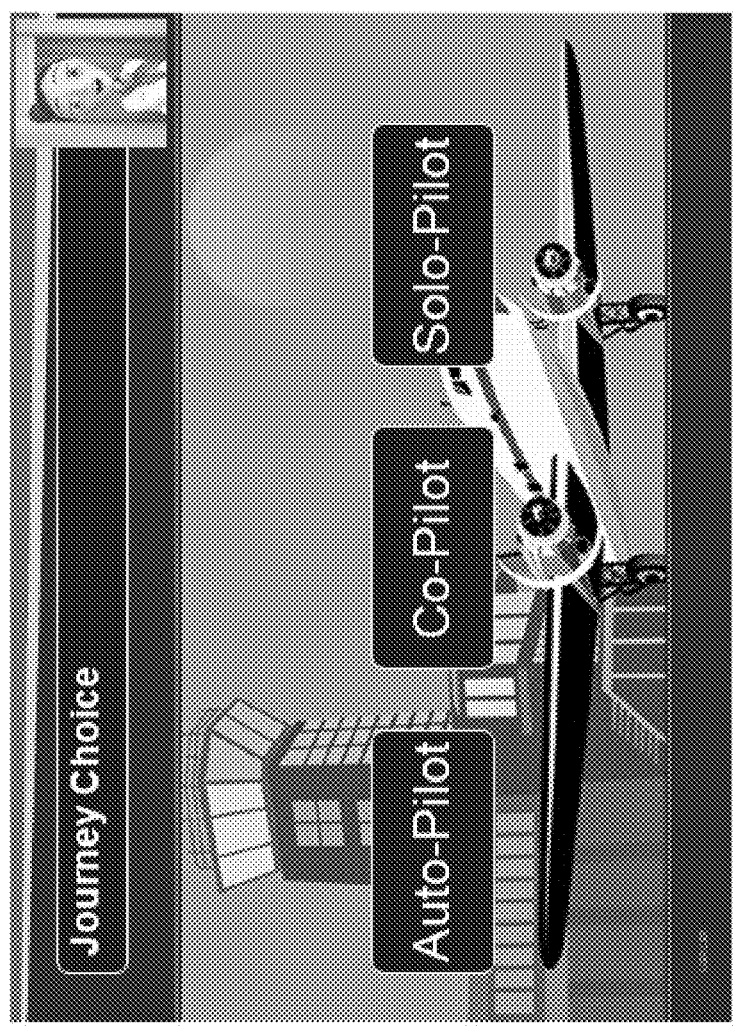

FIG. 6c shows a screen where a user can select, based on the desired amount of direct interaction with the metaphor (and therefore, with the user's benefit plan), to fly using auto-pilot (requiring the minimal amount of user interaction with the benefit plan), using a co-pilot (a moderate amount of user interaction required, balanced with certain automatic settings), or to fly solo manually (the most "hands-on" interaction with the benefit plan).

After the information is gathered, the metaphor can present a board of flights having a list of departing flights to various destinations, each of which is representative of a potential path that the benefit plan can take towards a user's retirement. The flights listed can include potential paths given the actual current plan situation, as well as potential alternatives if some of the benefit plan parameters were to be adjusted. The destination quality can be representative of the amount of plan payout at a particular retirement age, wherein the higher retirement income amount goals can be represented by increasingly glamorous destinations. For example, meeting or exceeding the desired annual income at a desired retirement age can be represented by a 'Paris' destination, whereas barely meeting the minimum income within the desired age (or within a certain amount of years after the desired retirement age) can be represented by a 'Cleveland, Ohio' destination. Additional layers of accomplishment can be represented by an indication that a user is travelling in first class, business class or coach.

If a user selects a desired or minimum retirement income amount that will not be reached within a desired retirement age (or within a range of years including the desired age), the flight can be represented as a flight having multiple stops or layovers along the way. The layovers can represent benefit plan adjustments to the plan that will necessarily have to be made at a future date for a user to be able to reach their ultimate destination (such as future contributions that will have to be increased).

During a flight, a user can be presented with options that can increase the throttle (change the contribution amount), change the destination (change the desired or requirement amounts or the desired retirement age). In response to these changes, the metaphor can update the flight plan accordingly, including via a visual announcement of the plane speeding up or changing course, and an audio announcement by the captain of the flight announcing the changes.

In another example, the user manages a benefits plan via an adventure metaphor, taking the persona of famous archeologist Iowa Williams, with an ultimate goal of obtaining the legendary relic Really Simple Cup of Immortality that will cement his place as the greatest archeologist ever. In this metaphor, the user's real-world benefits plan information indicating the current status of the benefit plan and how far the user is from their goal of retirement (e.g., financially and in terms of years from planned retirement, and can include how far away from an 'ideal' path the user currently sits in their benefit plan) can be used to in-metaphor determine the amount of individual quests that the user must complete to gather sufficient clues regarding the exact location of the Really Simple Cup of Immortality. Each individual quest can reflect yearly or pre-determined milestones of the benefit plan that the user needs to meet to get on track for the planned retirement and remain on the predicted path to retirement. Depending on the deviation of the user's current plan situation relative to the 'ideal' current plan situation, the individual quests can be of increasing difficulty that can be conquered by an in-game purchase of additional gear (causing increased contributions to the benefit plan by the user to help get the benefit plan "back on track"). The order of the individual quests can be user-selected, to account for the amount of difficulty a user is willing to take on at any particular moment.

Another example of a metaphor used to manage a benefits plan can be a construction metaphor, where the user is an architect trying to build the greatest structure they can, such as a majestic castle, the tallest building in the world, or a pyramid. As the benefit plan develops over time, the castle or structure is built, starting with working the land where the structure will sit, the foundation of the structure, the ground and subsequent floors, subsystems such as electrical systems, etc. In the construction metaphor, the amount of retirement income a user wishes to have by a designated retirement age can dictate the majesty, complexity, size or other measure of greatness of the planned structure represented via blueprints. Over time, the growth of the benefit plan is reflected in the metaphor by the materials used in the structure, the speed at which the structure is built, etc. Certain decisions made by the user to use better materials, or to add features to the structure that have a particular cost. In order to remain on schedule for the completion of the structure as planned, the user may have to make an in-metaphor decision to hire additional workers or to spend additional funds for the higher-quality materials, which in turn can cause an increase of the user's contributions to the benefit plan. Alternatively, the decision to make the structure bigger, fancier, more luxurious, etc., can reflect a desire to have an increased retirement income or a sooner retirement age, after which a user must decide to hire more workers (and as such, have a bigger contribution to the benefit plan) to stay on track for the completion of the structure by the planned date.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:
1. A system, comprising:
a benefit metaphor engine stored in a non-transitory computer readable storage medium, that is programmed to, when executed by a processor:
  receive at least one benefit data set corresponding to a benefit plan associated with a user;
  derive:
    a plurality of benefit attributes from the at least one benefit data set, the plurality of benefit attributes including a benefit user input attribute; and
    a plurality of benefit rule sets from the at least one benefit data set, the plurality of benefit rule sets from the at least one benefit data set including a benefit user input rule set associated with the benefit user input attribute, wherein:
      the benefit user input rule set comprises at least one benefit user input rule;
      each of the at least one benefit user input rule comprises at a rule defining an acceptable user input for carrying out a modification to the benefit plan; and
      the at least one benefit user input rule defines an input type for the acceptable user input;
  map:
    the plurality of benefit attributes to corresponding metaphor attributes of a plurality of metaphor rule sets associated with metaphor themes, including mapping the benefit user input attribute to a corresponding metaphor input attribute of the metaphor data set;
    the at least one benefit user input rule to a corresponding at least one metaphor input rule of the metaphor rule sets, wherein:
      the at least one metaphor input rule is of the same input type as the corresponding benefit input rule to which it is mapped:
      each of the at least one metaphor input rule comprises a rule defining an metaphor; and
  present the plurality of metaphor themes associated with the plurality of metaphor rule sets to the user for selection;
  receive, from the user, a selection of a first metaphor theme from the plurality of metaphor themes;
  generate a benefit metaphor skeleton as a function of the at least one metaphor attribute and the at least one benefit attribute;
  populate the benefit metaphor skeleton based on benefit attribute values corresponding to the at least one benefit attribute;
  generate a benefit metaphor by:
    applying first metaphor assets associated with the selected first metaphor theme to the benefit metaphor skeleton according to the benefit attribute values, wherein the metaphor assets include at least one of visual assets and audio assets corresponding to the fist metaphor theme; and
    applying, to the benefit metaphor skeleton, at least one first interactivity object associated with the selected first metaphor theme and corresponding to the at least one metaphor input rule, wherein:
      each first interactivity object comprises a first interface object depicted within the benefit metaphor according to the first metaphor theme to be presented to the user; and
      each interactivity object is programmed to receive a first user interaction such that the first user interaction is processed according to the associated metaphor input rule to generate a metaphor input value corresponding to the metaphor input attribute;
  cause an output device to present the benefit metaphor to the user;
  receive, from the user, a selection of a second metaphor theme from the plurality of metaphor themes;
  generate a second benefit metaphor by:
    applying second metaphor assets associated with the selected second metaphor theme to the benefit metaphor skeleton according to the benefit attribute values, wherein the second metaphor assets include at least one of visual assets and audio assets corresponding to the second metaphor theme and wherein the second metaphor assets replace the first metaphor assets; and
    applying, to the benefit metaphor skeleton, at least one second interactivity object corresponding to the at least one metaphor input rule, wherein:
      each second interactivity object comprises a second interface objective depicted within the second metaphor according to the second metaphor theme to be presented to the user;

each second interactivity objects is programmed to receive a second user interaction such that the second user interaction is processed according to the associated metaphor input rule to generate the benefit metaphor input value corresponding to the benefit metaphor input attribute; and wherein the at least one second interactivity object replaces the at least one first interactivity object; and replace the benefit metaphor with the second benefit metaphor by causing an output device to present the second benefit metaphor to the user.

2. The system of claim 1, wherein the at least one benefit attribute comprises at least one of:
a benefit plan identifier;
at least one benefit plan value set;
a benefit type identifier;
at least one benefit type rule;
at least one user data set; and
a metaphor theme selection identifier.

3. The system of claim 1, wherein the benefit metaphor engine is further programmed to derive at least one metaphor exempt data set from the at least one benefit data set, the at least one metaphor exempt data set comprising:
an identifier designating of one or more of the at least one benefit attribute as an exempt attribute; and
presentation information.

4. The system of claim 3, wherein the at least one benefit metaphor engine is further programmed to:
obtain a metaphor interrupt rule set based on the identified one or more exempt attributes; and
present the presentation information to the user outside of the benefit metaphor based on the metaphor interrupt rule set.

5. The system of claim 4, wherein the benefit metaphor engine is further programmed to terminate the presentation of the benefit metaphor prior to presenting the presentation information to the user.

6. The system of claim 4, wherein the benefit metaphor engine is programmed to suspend the presentation of the benefit metaphor prior to presenting the presentation information to the user.

7. The system of claim 4, wherein the benefit metaphor engine is programmed to present the presentation information by overlaying the presentation information over the presented benefit metaphor.

8. The system of claim 3, wherein the presentation information comprises at least one of an information disclosure required by law, a disclosure format required by law, and a presentation of the benefit plan.

9. The system of claim 1, wherein the at least one metaphor rule set comprises at least one of:
a metaphor theme;
at least one metaphor API;
at least one metaphor object;
a metaphor library; and
at least one metaphor asset.

10. The system of claim 9, wherein the metaphor theme comprises one or more of a travel theme, an adventure theme, a science fiction theme, a sports theme, a racing theme, a battle theme, a game theme, a television theme, a movie theme, a board game theme, a musician theme, a comedy theme, a dramatic theme, a video game theme, a licensed theme, a social network theme, a religious theme, a scientific theme, a nostalgia theme, a patent theme, a legal theme, a meta theme, and an evolution theme.

11. The system of claim 1, wherein the benefit metaphor engine is further programmed to:
receive at least one additional benefit data set;
derive at least one additional benefit attribute from the at least one additional benefit data set; and
modify the benefit metaphor based on the at least one additional benefit attribute.

12. The system of claim 1, wherein the benefit metaphor engine is further programmed to:
generate a benefit metaphor score as a function of the at least one benefit attribute;
present the benefit metaphor score to the user within the benefit metaphor; and
present a reward to the user based on the metaphor score.

13. The system of claim 12, further comprising a scoreboard engine programmed to:
obtain the benefit metaphor score from the benefit metaphor engine;
obtain at least one additional benefit metaphor score from at least one additional benefit metaphor engine; and
generate a scoreboard comprising the benefit metaphor score and the at least one additional benefit metaphor score organized by ranking; and
present the scoreboard to the user.

14. The system of claim 1, wherein the benefit metaphor engine is further programmed to, when executed by a processor:
prior to updating the presentation of the benefit metaphor, verify that the benefit user input has been successfully applied; and
in response to a successful verification, update the presentation of the benefit metaphor based on the metaphor user input.

15. The system of claim 1, wherein the benefit metaphor engine programmed to, when executed by a processor, apply the benefit user input to the benefit plan further comprises the benefit metaphor engine further programmed to, when executed by a processor:
apply the benefit user input to a source benefit plan information set stored by a provider of the benefit plan;
update the source benefit plan information set according to the benefit user input; and
update the benefit plan data set based on the updated source benefit plan information.

* * * * *